Patented Aug. 28, 1951

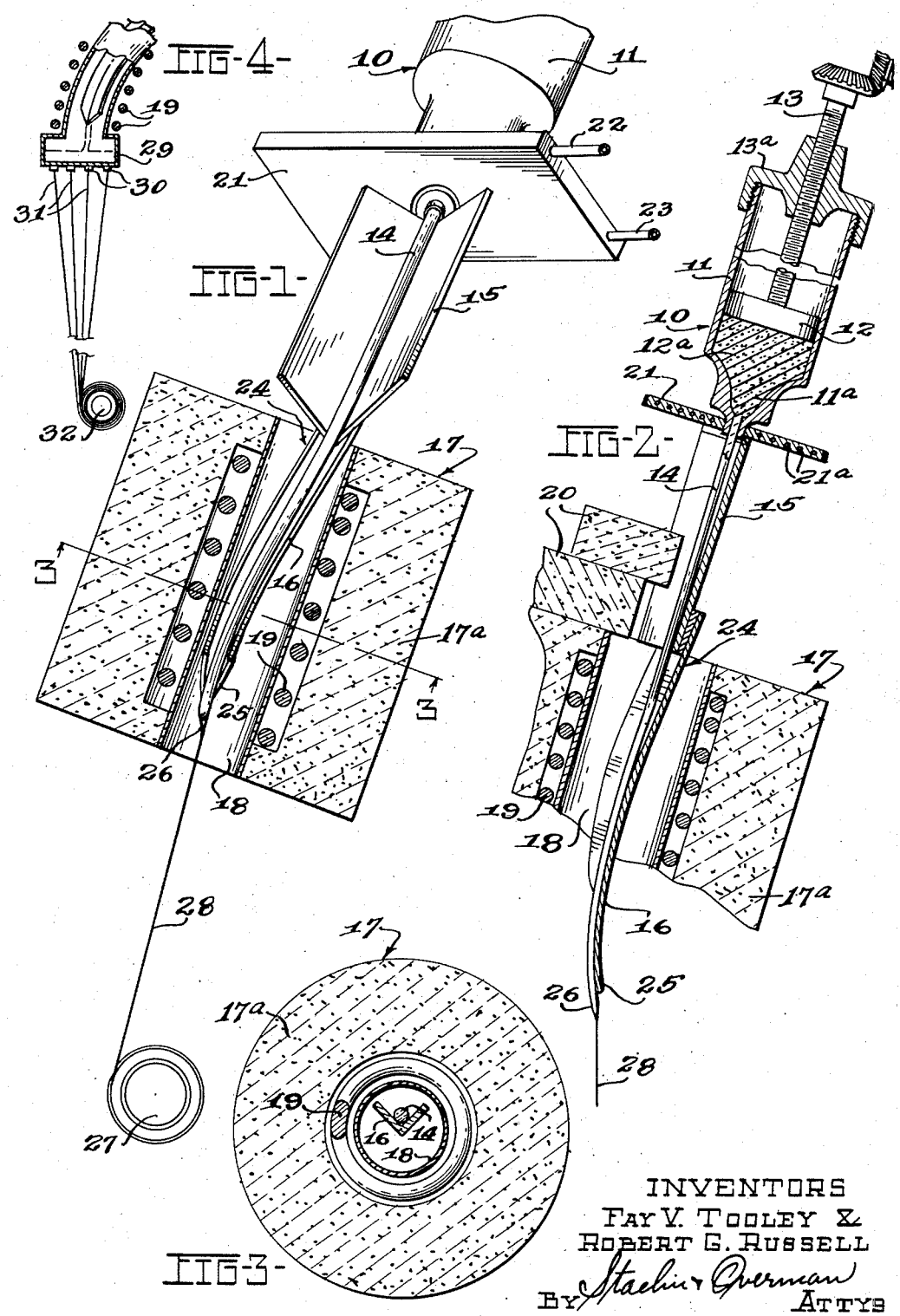

2,566,252

UNITED STATES PATENT OFFICE 2,566,252

APPARATUS FOR PRODUCING GLASS TO BE ATTENUATED TO FIBERS

Fay V. Tooley and Robert G. Russell, Newark, Ohio, assignors to Owens-Corning Fiberglas Corporation, Toledo, Ohio, a corporation of Delaware Application September 21, 1945, Serial No. 617,863

3 Claims. (Cl. 49—53)

This invention relates generally to the processing of heat softenable materials such as glass or the like and refers more particularly to an improved apparatus for reducing raw batch materials to a molten state and also to further operations on the material in molten state to attenuate fibers therefrom.

One process that is used extensively in the manufacture of glass fibers is to form marbles or other cullet from molten glass of desired composition and thereafter melt the marbles in a feeder having a multiplicity of discharge orifices through which the molten glass flows in the form of streams. As the streams of molten glass leave the orifices, they are drawn by suitable attenuating means to form fibers.

The present invention has at its object the elimination of all of the operations attendant to forming glass marbles. Some of these operations are melting the batch material, molding the molten glass to form the cullet of the required size and shape, collecting the marbles, feeding the marbles to a melting unit, feeding the resulting molten glass and all operations incident to forming fibers from the marbles. Elimination of these operations permits the production of fibers with less equipment and with less handling. As a result, manufacture of the fibers on a production basis is simplified and the cost of such manufacture is reduced to a minimum. Moreover, the possibility of producing higher quality fibers is also enhanced as there is less opportunity for impurities and irregularities such as stones and seeds to be introduced into the glass during the melting and forming processes.

The presence of stones, seeds and other impurities in the cullet is especially objectionable when producing fine fibers by attenuating small streams flowing from the usual melter and feeder. Such impurities interfere with proper flow of the molten glass through the small orifices and hence with the attenuation of the fibers and frequently cause breakage of one or more of the molten glass streams or the fibers. This not only results in deterioration of the quality of the strand of the fibers produced but also necessitates interruption of the production of the equipment for a period of time sufficient to initiate flow of glass from an orifice stopped by a seed or stone.

One of the principal objects of this invention is to produce fine glass fibers of substantially continuous length with the minimum likelihood of interruption of the process by breakage of the fibers during attenuation of the latter. By forming the fibers directly from the batch materials, the materials are kept free of contact with the usual refractories and trouble from refractory stones and one of the principal causes of breakage of the streams of molten glass is eliminated.

Another object of this invention is to greatly simplify the equipment by eliminating the feeder with its orifices and by dispensing with the means heretofore provided for producing the marbles or cullet.

In accordance with the present invention, a suitable glass batch material is extruded or otherwise formed into a rod, which is advanced through a heated zone having a temperature sufficiently high to melt the glass batch forming the rod. As the batch melts, the molten glass is attentuated to the form of fibers. The molten glass may be caused to flow along a confined path determined by a trough, which is restricted at the discharge end to form a tip or point of such construction as to enable molten glass to flow in the form of a small stream. As the glass stream leaves the trough, it may be drawn by any suitable attenuating equipment into a fiber of the desired size.

Another object of this invention is to condition the batch material as the rod is advanced to facilitate subsequent conversion of the batch to glass. This is done by heating the coherent batch material in a specified time-temperature cycle before it is introduced to the melting zone and actually melted.

Still another feature of this invention is the provision of an improved apparatus of the above general type having means for producing a multiplicity of substantially continuous fibers directly from glass produced by melting a rod or other shape of consolidated and heat treated batch material.

A still further object of this invention is to carry out the several steps of the above process with compact and relatively simple apparatus, which will be made more apparent as this description proceeds, especially when considered in connection with the accompanying drawing, wherein:

Figure 1 is a diagrammatic perspective view of one type of apparatus forming the subject matter of this invention and capable of performing the various steps of the process, which also forms a part of the present invention;

Figure 2 is a side elevation partly in section of the apparatus shown in Figure 1;

Figure 3 is a cross-section taken substantially on the plane indicated by the line 3—3 of Figure 1; and Figure 4 is a diagrammatic view illustrating a modified form of apparatus.

While the process forming the subject matter of this invention may be performed with various different types of apparatus, particularly satisfactory results have been attained by employing equipment embodying the general principles of the apparatus selected herein for the purpose of illustration. It is believed that the process will be more readily understood upon considering a detailed description of the apparatus and, accordingly, attention is directed to Figures 1 to 3 inclusive of the drawings.

The apparatus shown in the above figures of the drawing comprises a batch press 10 of the displacement type having a cylinder 11 and a piston 12 reciprocably mounted in the cylinder. The cylinder 11 is supported in any suitable manner with its axis inclined with respect to the vertical and is formed with a restricted discharge opening 11a at the lower end. The piston 12 is preferably secured on a screw 13 threadably supported in a cap 13a closing the upper end of the cylinder and connected to a prime mover (not shown), such as an electric motor. The above, or an equivalent construction, is preferred, because it assures advancing the piston 12 at a uniform rate of travel in the cylinder 11.

The portion of the cylinder 11 below the piston 12 is filled with a glass batch 12a from which fine glass fibers may be formed when the heat treatment and melting procedure to be described are followed. The glass batch material is coherent and has a consistency which enables the same to be extruded from the restricted discharge opening 11a in the lower end of the cylinder 11 in the form of a rod. When employing a batch containing the materials required to form glass, it is usually necessary to incorporate a binder in the batch. The binder may be an inorganic material, such as clay, sodium silicate, etc., or an organic material such as gum arabic, glucose, molasses, sucrose, paraffin, or the like. This binder is mixed with the glass batch in the quantities required to enable the particles of the batch to adhere together when the batch is extruded from the cylinder in the form of a plastic rod 14. The amount of binder required may be varied depending upon the particular binding material selected and the type of glass batch, but ranges usually from about 5% to 40% by weight of the batch.

Batches suitable for the production of glass fibers usually consist of a mixture of various proportions of silica, soda, lime, boric oxide, alumina, etc. with or without other suitable materials such as coloring agents. The various batch ingredients are either processed or so selected that the materials are all of a small particle size, for instance, will pass through a screen having in the neighborhood of 325 meshes per inch, while the materials offering the greatest resistance to melting, such as silica, are smaller than this if available. The batch ingredients in the desired proportions are then thoroughly mixed together to a substantially homogeneous mass, and water and a binding material, if the latter is found necessary, are added in amounts to provide a consistency of the batch suitable for extrusion into a rod of the required diameter. In order to provide the batch with the required consistency it is preferable to add to the batch sufficient water to adjust the water content of the batch to 10 to 60% in most instances, depending on the fineness of the batch and on whether the batch is of the carbonate or hydrate types. The best consistency for extruding any particular batch composition is most easily determined by simple trial, the aim being to employ the minimum water that will provide a batch material that is readily extruded into a rod of ample integrity to withstand later steps in the process.

The mixed batch of the proper consistency is placed in the cylinder 11 and is then extruded in the form of the rod 14. The diameter of the rod 14 may vary but in general should be as small as is consistent with general operating conditions so that the minimum time is required for the batch at the geometric center of the rod to reach melting temperatures. Preferably the rod is from about $\frac{1}{16}$ inch to $\frac{1}{4}$ inch in diameter. If the diameter of the rod is much greater than this, its center portion will remain for too long a period in a condition characterized by the presence of a liquid phase sufficient to permit migration of the more difficultly meltable portions of the batch, and objectionable segregation of the batch results. For this reason the use of a small rod of fine batch is advantageous since the grains will be in intimate contact due to their small size and more readily absorb and transmit heat to their interiors and to the interiors of the rods so that a uniform heating is accomplished.

As the rod 14 of batch material is extruded from the cylinder 11, it is received in an elongated trough-shaped guide 15 suitably supported at the same angle of inclination to the vertical as the cylinder 11. The angle of inclination is predetermined so that the trough-shaped guide 15 frictionally supports the extruded batch rod 14 and tends to retard advancement of the rod along the trough so that the rod is subjected to a minimum of tension stresses.

Positioned at the delivery end of the trough-shaped guide 15 is a second elongated trough-shaped guide 16 formed of a heat-resistant material such as nickel, molybdenum or platinum. The second guide 16 is secured to and in substantial alignment with the first guide 15. The guide 16 is disposed within a melting unit 17 comprising a refractory body 17a having a cylindrical opening therein. A tube 18 arranged within the opening is formed of a heat resistant material similar to the material from which the guide 16 is formed and prevents refractory particles from coming in contact with the softened batch. The tube 18 is surrounded by an induction or resistance coil 19 connected in a suitable electric circuit (not shown) and capable of producing a temperature within the tube 18, which is sufficient to melt the extruded batch rod 14. The temperature employed, of course, varies in accordance with the nature of the batch material used, but it has been found that a temperature of approximately 2700° F. is sufficient to convert glass batch to a molten mass having the viscosity most suitable for forming fine, continuous fibers.

Owing to the arrangement shown in Figure 1 of the drawing, it will be noted that heated air is free to escape through the upper end of the tube 18. The heated air escaping through the upper end of the tube 18 is directed against the trough-shaped guide 15 and the extruded rod 14 of batch material. As a result, the batch material forming the rod 14 is dried and conditioned so that practically all moisture is evaporated from the batch material and gas removed from potentially gas-forming constituents before the batch rod is introduced into the heating zone or tube 18. The heat applied to the extruded rod to dry it and condition it may be regulated in any suitable fashion, as by means of adjustable blocks 20 of refractory material arranged to be moved over the upper end of the tube to selected extent.

For most glass-forming batches this preliminary calcination should be at temperatures ranging from about 1200° F. to 1800° F. for several minutes, depending on the glass composition and batch materials used. The preferable temperature in each individual case is readily ascertained by testing the heat-treated batch to find the temperature at which substantially all gas is removed from the batch but at which there is formed insufficient liquid phase to permit relative movement of the batch particles. The presence of this undesirable liquid phase is manifested by a tacky or sticky and soft condition of the batch.

It is, of course, desirable to prevent drying of the batch material in the cylinder 11 by the heated air escaping through the upper end of the tube 18 and this may be accomplished by positioning a baffle 21 at the discharge end of the cylinder 11. The baffle 21 is formed with passageways 21a to enable the circulation of a cooling medium therethrough. In Figure 1 of the drawing, the reference character 22 indicates an intake conduit through which cooling water is supplied to the baffle 21 and the numeral 23 designates the exhaust conduit for the water.

In actual practice, it has been found desirable to relieve the rod of batch material from frictional contact with both guides at the zone where the less refractory constituents of the batch fuse. In this zone, the batch material becomes tacky or sticky and may have a tendency to adhere to the adjacent supporting surface. Such action may interfere with proper advancement of the rod 14 and is overcome in the present instance by forming the trough-shaped guide 16 with a depression 24. The depression 24 is located to relieve the batch rod from contact with the guiding surfaces during advancement of the rod throughout the so-called sticky or tacky stage, and sticking of the batch material to the guiding surfaces is thereby avoided.

As the batch rod advances into the heated zone within the heating coil 19, the batch is quickly converted to a seed-free, stone-free glass because of the intimate relation of the particles of the batch constituents and because of the prior removal of gases from the constituents.

The lower end of the trough-shaped guide 16 terminates in the tube 18 and is fashioned to form a discharge tip or point 25. As a result, the viscous glass material is discharged from the point 25 in the form of a stream indicated in Figures 1 and 2 of the drawing by the reference character 26. As this stream enters the atmosphere, it is drawn or attenuated by a drum 27 into a fine glass fiber 28 and the fiber wound into a package by the drum supported for rotation about its axis. Any suitable means may be provided for rotating the drum.

The embodiment of the invention shown in Figure 4 may be employed in instances where it is desired to simultaneously form a plurality of fibers of substantially continuous length. This embodiment differs principally from the one previously described in that a cup-shaped feeder 29 is connected to the lower end of the tube 18 and is preferably formed of the same material as the tube 18. Also in the modified construction, the lower end of the trough-shaped guide 16 need not be fashioned to form a discharge point as the molten glass discharged from the trough is collected in the feeder 29. The feeder 29 in turn is provided with a multiplicity of nipples 30 on the bottom wall thereof and the nipples are respectively formed with orifices through which molten glass flows in the form of streams 31. In order to insure maintaining the molten glass collected in the feeder 29 at the proper viscosity, the heating coils 19 may be extended to also surround the feeder 29.

As the streams of glass issue from the discharge orifices in the feeder 29, they are attenuated simultaneously to form a corresponding number of fibers by a rotating drum 32, which corresponds to the drum 27 previously described.

Both embodiments of this invention render it possible to form substantially continuous fibers directly from the batch material. The intermediary steps of forming glass marbles or other cullet from the batch material and remelting the cullet in a feeder to form fibers, as well as the equipment and disadvantages attendant to these intermediary steps, are eliminated. As a result, fine glass fibers may be produced economically with relatively simple equipment.

We claim:

1. Apparatus for producing glass comprising means for extruding a coherent glass batch in the form of a rod in a general downward direction, downwardly inclined guiding means positioned to receive the rod of batch material issuing from the extruding means and having a portion intermediate the ends depressed to relieve the batch from frictional contact with the guiding means, means for heating the guiding means below the depressed portion to a temperature sufficiently high to melt the batch and form a body of viscous glass.

2. Apparatus for producing glass to be attenuated to fibers comprising means for extruding and feeding a coherent glass batch in the form of a rod in a general downward direction, a downwardly inclined guide formed of heat resistant material positioned to receive the rod issuing from the extruding means, said guide having a depressed portion to relieve the rod from frictional contact with the guide, and means for heating the rod in the region below said depressed portion to a temperature sufficiently high to melt the glass batch and form a body of viscous glass.

3. Apparatus for producing glass comprising means for extruding and feeding a coherent glass batch in the form of a rod in a general downward direction, downwardly inclined guiding means positioned to receive the rod of batch material issuing from the extruding means and having a pointed tip at its lower end, said guide having a depressed portion medially of its length to provide spaced regions of contact with the rod, and means for heating the rod in the region of the lower end of the guiding means to a temperature sufficiently high to melt the batch and form a body of glass sufficiently viscous to flow from the tip in the form of a stream.

FAY V. TOOLEY.
ROBERT G. RUSSELL.

REFERENCES CITED

The following references are of record in the file of this patent:

UNITED STATES PATENTS

| Number | Name | Date |
| --- | --- | --- |
| 708,309 | Bronn | Sept. 2, 1902 |
| 946,179 | Weiskopf | Jan. 11, 1910 |
| 1,657,442 | Miller | Jan. 24, 1928 |
| 1,874,799 | Peiler | Aug. 30, 1932 |
| 2,018,478 | Whittier | Oct. 22, 1935 |
| 2,212,448 | Modigliani | Aug. 20, 1940 |
| 2,328,125 | Buchsbaum et al. | Aug. 31, 1943 |

FOREIGN PATENTS

| Number | Country | Date |
| --- | --- | --- |
| 481,690 | Great Britain | Mar. 16, 1938 |